(No Model.)
N. JOERGENSEN.
AUXILIARY CAR SEAT.
No. 426,278.        Patented Apr. 22, 1890.
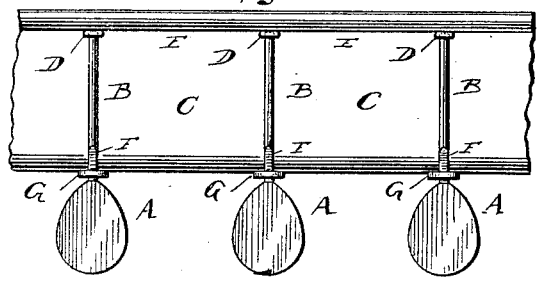
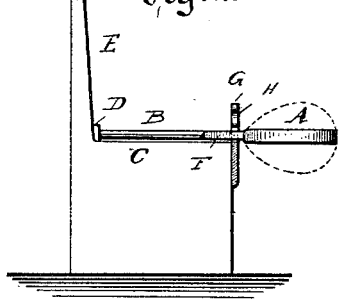
WITNESSES:
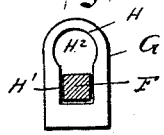
INVENTOR
Niels Joergensen
BY
ATTORNEYS ated April 22, 1890.

UNITED STATES PATENT OFFICE.

NIELS JOERGENSEN, OF NEW YORK, N. Y.

AUXILIARY CAR-SEAT.

SPECIFICATION forming part of Letters Patent No. 426,278, dated April 22, 1890.

Application filed December 28, 1889. Serial No. 335,199. (No model.)

*To all whom it may concern:*

Be it known that I, NIELS JOERGENSEN, of the city, county, and State of New York, a citizen of the United States, have invented certain new and useful Improvements in Auxiliary Car-Seats, of which the following is a specification.

The object of my invention is to provide a new and improved auxiliary seat for cars, which seat is arranged between and in front of the ordinary seats, and can be adjusted to be out of the way when not in use and can easily be projected from the fronts of the ordinary seats when required.

In the accompanying drawings, Figure 1 shows a number of my improved auxiliary car-seats in plan view as adjusted for use. Fig. 2 is a side view of the same, parts being in section. Fig. 3 is an enlarged face view of the locking-clip, the seat-bar being in section.

Similar letters of reference indicate corresponding parts.

The auxiliary seat A, which has approximately the shape of an oval, is secured to the front end of a rod B, extending across the row of ordinary car-seats C, said rods being arranged a distance from each other equal to the width of an ordinary car-seat. In case parting-strips are arranged between the seats C said rods B are arranged above said strips. The inner ends of the rods B are held and mounted to turn axially and to swing slightly up and down in sockets D, arranged on the bottom part of the seat-backs E and the front ends F of the rods B, which front ends are squared and are passed through apertures H in clips G, secured to the fronts of the seats and projecting slightly above the tops of the same. Said apertures H have a squared lower part H' and a circular upper part H².

When the seats are not in use, they stand vertically, as shown in dotted lines in Fig. 2, and are locked in this position by the squared parts F of the rods B engaging the sides of the squared parts H' of the apertures H in the clips G. When the seats A are to be used, they are lifted to remove the squared parts F of the rods B out of the squared parts H' of the apertures H, and are then turned ninety degrees, so as to be horizontal, and then lowered, whereby they are locked in place by the squared parts F of the rods B engaging the squared parts H' of the apertures H.

The auxiliary seats A project in front of the ordinary car-seats and can be occupied without any inconvenience to the persons occupying the ordinary car-seats C.

Having thus described my invention, I claim as new and desire to secure by Letters Patent—

The combination, with an ordinary car-seat, of rods extending across the seats transversely to the same, sockets in which the inner ends of said rods can turn axially and swing up and down slightly, seats on the outer ends of said rods, and clips secured to the front of the car-seats and having apertures, the lower parts of which are squared and the upper parts made circular, the front ends of the rods being squared and passed through the apertures in the clips, substantially as set forth.

In testimony that I claim the foregoing as my invention I have signed my name in presence of two subscribing witnesses.

NIELS JOERGENSEN.

Witnesses:
    W. REIMHERR,
    SOL. N. ROSENBAUM.